United States Patent
Newstadt et al.

(10) Patent No.: US 10,135,868 B1
(45) Date of Patent: Nov. 20, 2018

(54) DEFEATING WIRELESS SIGNAL INTERFERENCE HACKS BY MANIPULATING SIGNAL STRENGTH

(71) Applicant: Symantec Corporation, Mountain View, CA (US)

(72) Inventors: Keith Newstadt, West Newton, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 119 days.

(21) Appl. No.: 15/475,013

(22) Filed: Mar. 30, 2017

(51) Int. Cl.
| | | |
|---|---|---|
| *G06F 11/00* | (2006.01) | |
| *H04L 29/06* | (2006.01) | |
| *H04W 12/06* | (2009.01) | |
| *H04W 12/12* | (2009.01) | |

(52) U.S. Cl.
CPC ........ *H04L 63/1491* (2013.01); *H04L 63/083* (2013.01); *H04W 12/06* (2013.01); *H04W 12/12* (2013.01)

(58) Field of Classification Search
USPC ............................... 726/22–25; 713/187–189
See application file for complete search history.

(56) References Cited

U.S. PATENT DOCUMENTS

| | | | | |
|---|---|---|---|---|
| 6,539,006 B1 * | 3/2003 | Taylor | .................. | H04B 1/7117 370/331 |
| 8,199,104 B2 * | 6/2012 | Park | ........................ | G06F 3/014 345/156 |
| 8,369,853 B1 * | 2/2013 | Sarkar | ............... | H04W 36/0083 370/352 |
| 8,565,434 B2 * | 10/2013 | Qing | ..................... | H04W 12/04 380/277 |
| 8,862,400 B2 * | 10/2014 | Kelly | ................. | G06Q 30/0201 701/522 |
| 8,879,678 B1 * | 11/2014 | Rajurkar | ........... | H04W 52/0251 375/347 |
| 9,226,336 B2 * | 12/2015 | Sun | ........................ | H04W 84/12 |
| 10,021,123 B2 * | 7/2018 | Das | ..................... | H04L 41/0631 |

(Continued)

OTHER PUBLICATIONS

Bengali, Shashank, "Inside the Indian IRS scam that cheated U.S. taxpayers out of millions," LA Times, Nov. 22, 2016, 5 pages.

(Continued)

*Primary Examiner* — Amare F Tabor
(74) *Attorney, Agent, or Firm* — Patent Law Works LLP

(57) ABSTRACT

A method for defeating wireless signal interference hacks is described. The method may include monitoring operations associated with user input of a user into an application on a mobile computing device. The user input may include physical interaction by the user's fingers with the mobile computing device causing signal interference by the fingers with a wireless signal transmitted by the mobile computing device such that a position of the fingers is detectable by a third party receiving the wireless signal. The method may include detecting an information entry event based on the monitored operations, modifying a wireless signal strength of the wireless signal transmitted by the mobile computing device from a standard signal strength level such that the position of the fingers of the user on the mobile computing device is not detectable by the third party receiving the wireless signal in response to detecting the information entry event.

18 Claims, 5 Drawing Sheets

(56) References Cited

U.S. PATENT DOCUMENTS

| | | | | |
|---|---|---|---|---|
| 2008/0291158 | A1* | 11/2008 | Park | G06F 3/014 |
| | | | | 345/156 |
| 2010/0328076 | A1* | 12/2010 | Kyle | G06F 19/3418 |
| | | | | 340/573.1 |
| 2012/0139708 | A1* | 6/2012 | Paradiso | G06F 3/014 |
| | | | | 340/10.1 |
| 2013/0039391 | A1* | 2/2013 | Skarp | H04W 4/023 |
| | | | | 375/148 |
| 2014/0074399 | A1* | 3/2014 | Kelly | G06Q 30/0201 |
| | | | | 701/522 |

OTHER PUBLICATIONS

Stump, Lawrence, "Sheriff's Log Shows Scams and Fraud more Common in Custer County," SandhillsExpress.com, Dec. 13, 2016, 5 pages.

"Use WiFi to Detect an Intruder," <Http://www.aerial.ai/product-2/> Retrieved from the Internet on Mar. 31, 2017, 6 pages.

\* cited by examiner

DEFEATING WIRELESS SIGNAL INTERFERENCE HACKS BY MANIPULATING SIGNAL STRENGTH

TECHNICAL FIELD

This disclosure pertains generally to computer security, and more specifically to wireless signal interference hacks.

BACKGROUND

The leakage of proprietary and/or confidential data is a continuing problem especially as unauthorized parties or criminals have begun using new techniques to eavesdrop on information entered into computing devices by users. For example, some attacks on mobile and other connected computing devices rely on the fact that devices move from location to location and wirelessly communicate with various networks and other devices.

New attacks using signal interference, such as Wi-Fi™ interference, are threatening users and their data. Attackers can watch the variances in Wi-Fi™ signal strength emitted from a computing device and use the variances to reconstruct the physical location of a user's fingers on a touch screen, keypad, or other input device. The attackers can use this information to detect a user's location as well as steal keystrokes, which may include passwords, as a user enters them.

Very few solutions have been proposed to defeat such interference-based hacks. Some researchers have suggested randomizing the location of keys on a virtual keyboard or keypad; however, this would cause confusion and frustration to the user. Accordingly, there are no satisfactory mechanisms to protect against such attacks.

It would be desirable to address these issues.

SUMMARY

A computing device may monitor operations associated with user input of a user into one or more applications on a mobile computing device, wherein the user input comprises physical interaction by one or more fingers of the user with the mobile computing device causing signal interference by the one or more fingers of the user with a wireless signal transmitted by the mobile computing device such that a position of the one or more fingers of the user is detectable by a third party receiving the wireless signal.

The computing device may detect an information entry event based on the monitored operations on the mobile computing device. In some embodiments, the information entry event may comprise entry of sensitive information into the mobile computing device by the user. For instance, the information entry event may include entry of a password into the one or more applications on the mobile computing device by the user. In some embodiments, the information entry event may include entry of a credit card number into the one or more applications on the mobile computing device by the user.

In response to detecting the information entry event, the computing device may modify a wireless signal strength of the wireless signal transmitted by the mobile computing device from a standard signal strength level such that the position of the one or more fingers of the user on the mobile computing device is not detectable by the third party receiving the wireless signal. In some embodiments, modifying the wireless signal strength of the wireless signal further comprises ceasing transmission of the wireless signal by the computing device during the information entry event. In some embodiments, modifying the wireless signal strength of the wireless signal further comprises modulating the wireless signal strength of the wireless signal during the information entry event according to a random pattern of modulation. For instance, the random pattern of modulation may have a defined minimum signal level, the defined minimum signal level being defined to avoid a loss of a network connection, the network connection using the wireless signal. In some embodiments, a wireless signal strength of the wireless signal transmitted by the mobile computing device is further based on one or more criteria. The one or more criteria may include that a wireless radio of the mobile computing device is turned on. The one or more criteria may include that the mobile computing device is communicatively connected to an untrusted wireless network via the wireless signal In some embodiments, modifying the wireless signal strength of the wireless signal further comprises modulating the wireless signal strength of the wireless signal during the information entry event according to a specific pattern of modulation. For example, the specific pattern of modulation may be determined for a user based on a training of signal interference with the wireless signal by the one or more fingers of the user during entry of text on the mobile computing device. In another example, the specific pattern of modulation further comprises a pre-recorded signal strength pattern, the pre-recorded signal strength pattern configured to simulate entry of honeypot text by the user into the mobile computing device, the simulated entry of the honeypot text being configured to mimic signal interference of the one or more fingers of the user with the wireless signal during entry of the honeypot text.

In some embodiments, the computing device may record contextual information of the information entry event and associate the contextual information with the honeypot text. The contextual information may further comprise a geographic location of the computing device during the information entry event. The contextual information may further comprise wireless network connection information of the mobile computing device during the information entry event.

In some embodiments, the computing device may detect usage of the honeypot text and flag the contextual information as a potential security risk. For example, the honeypot text may further comprise a honeypot credit card number and detecting usage of the honeypot text may further comprise detecting usage of the honeypot credit card number by a banking entity associated with the honeypot credit card number. In another example, the honeypot text may further comprise a honeypot password and usage of the honeypot text may be detected by detecting entry of the honeypot password into a server, and receiving notification from the server that the honeypot text has been used.

The computing device may return the wireless signal strength to the standard signal strength level after the information entry event.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict various embodiments for purposes of illustration only. One skilled in the art will readily recognize from the following discussion that alternative embodiments of the structures and methods illustrated herein may be employed without departing from the principles described herein.

DESCRIPTION

A data security management system 101 is described herein that can defeat wireless signal interference hacks by manipulating signal strength of a wireless signal. For example, the data security management system 101 may modify a signal strength in order to prevent or hide interference caused by a user physically inputting information into a computing device.

In some embodiments, the techniques described herein are designed to defeat Wi-Fi™ interference hacks, which can infer a user's physical movements in order to spy on the user and/or steal keystrokes. The techniques may defeat these attacks by manipulating the Wi-Fi™ signal strength of the user's computing device in order to disguise the user's location, the location of the user's fingers on the computing device (e.g., on a keypad, touch screen, etc.), and/or simulate a fake information that can be detected later to identify the attack (e.g., location, network, etc.).

It should be noted that although this description makes reference to a Wi-Fi™ signal, the techniques described herein may also be applicable to other wireless signals and/or communication protocols, such as Bluetooth®, Zigbee®, WiMax™, Z-Wave™, cellular communications, etc. For example, in some embodiments, the wireless signal may be based on the IEEE 802.11x (e.g., ac, b, g, n, etc.) standards of the Wi-Fi Alliance although the wireless signal may include any other form of wireless signal with characteristics making the wireless signal vulnerable to interference-based hacks.

In some such signal interference based hacks, a user's body (e.g., finger, hand, or an extension, such as a stylus, etc.) interferes with a wireless signal transmitted by a computing device, such as a smartphone, tablet, or even a laptop, which causes the wireless signal (e.g., the strength thereof) to vary in such a way that the signal variances can be detected by a receiving device, such as a router. For example, the signal may vary differently based on a position of hand or finger, how much of a touch screen or input device is covered, etc. For instance, a user's finger may cover buttons on a virtual keyboard on a touch screen mobile computing device.

Figure 5:
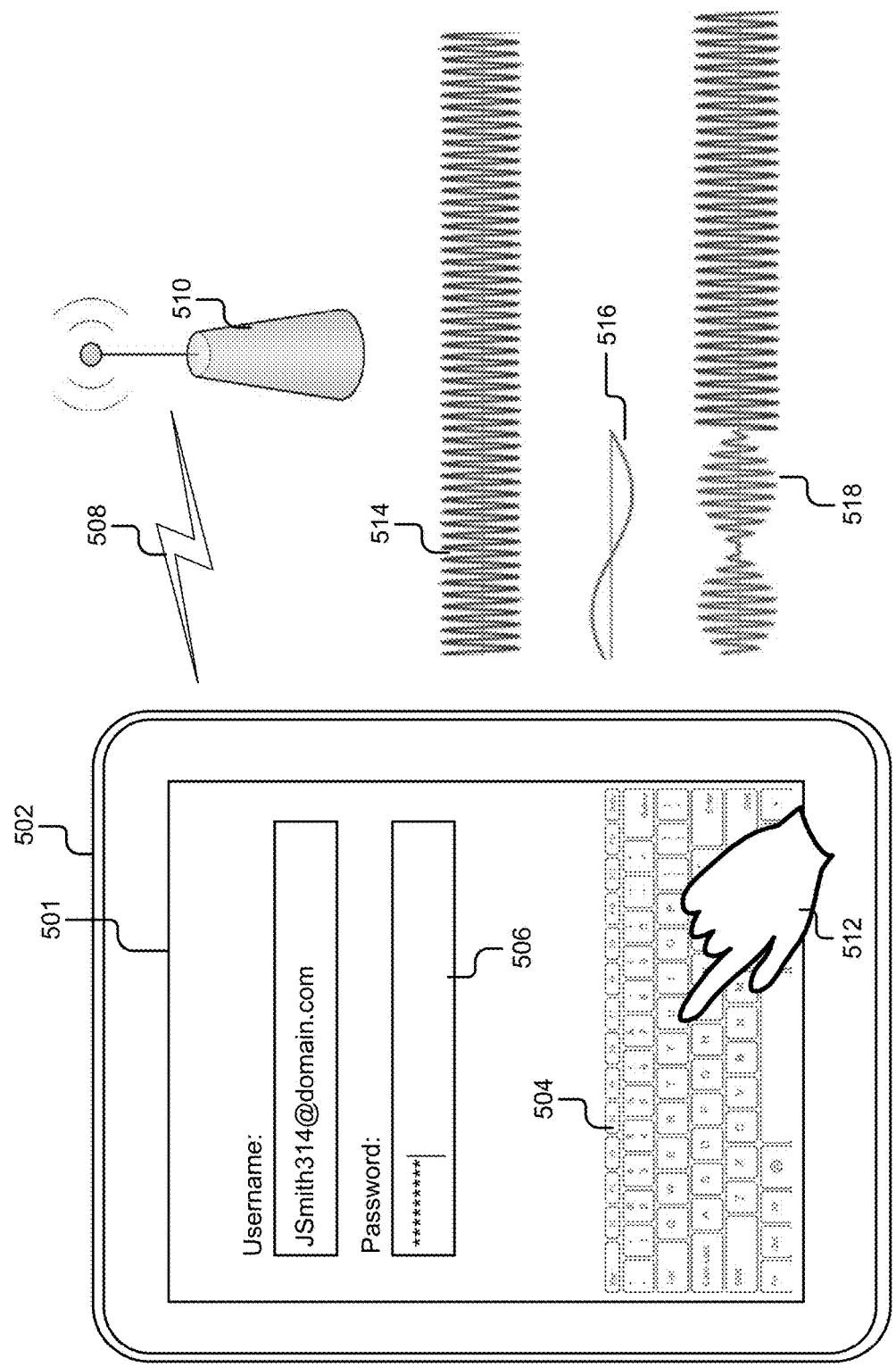
FIG. 5 is an illustration of an example mobile computing device and example wave diagrams showing interference caused by a finger, according to some embodiments.

Interference based hacks may rely on a constant signal that is affected by the position of a user, for example. Accordingly, some embodiments of the techniques described herein modify one or more wireless signals transmitted by a computing device in order to disguise the position of the user/the user's hands, fingers, a stylus, etc. An example of signal interference that may be used in interference based hacks is illustrated in FIG. 5.

In some embodiments, the data security management system 101 manipulates the signal strength of a wireless signal transmitted from a wireless radio on the client device 103. For example, the data security management system 101 may vary the signal strength (e.g., from the relatively constant signal strength normally transmitted by the wireless radio of the client device 103) continuously during operation of the client device 103 (e.g., when the client device 103 is powered on, active, or connected to a wireless network, etc.), during a specific time, such as during the information entry event described herein, or in response to certain criteria (e.g., when there is enough Wi-Fi™ activity that an interference based attack would be feasible, when the client device 103 is connected to an unknown/untrusted network). For example, an information entry event may include that a user is entering, or is about to enter, text on the client device 103.

In some embodiments, the data security management system 101 may vary the signal strength of the wireless signal according a random pattern, a set pattern (e.g., a pre-recorded pattern, ceasing wireless signal transmission for a defined time, or a customized pattern for the user). In some embodiments, the set pattern may cause the resulting signal to mask input by the user and/or mimic interference with the wireless signal that would be generated by the user entering honeypot text into the client device 103. For example, as described in further detail herein, the honeypot text may be used (e.g., by the fraud detection system 109) to identify an attacker, network, locations, etc., where an interference based hack to detect information entered by the user into the client device 103.

Some sophisticated versions of interference based hacks, especially when trained for a particular user, can recognize the user's interactions with a computing device with a precision exceeding ninety percent. For instance, the signal interference may vary among different users, so an attack may be trained for a user, because different users have different sized/shaped hands, hold mobile computing devices differently, or interact with mobile computing devices differently. Similarly, some embodiments of the techniques described herein may customize signal modification for a particular user to better disguise user interactions or provide honeypot information.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
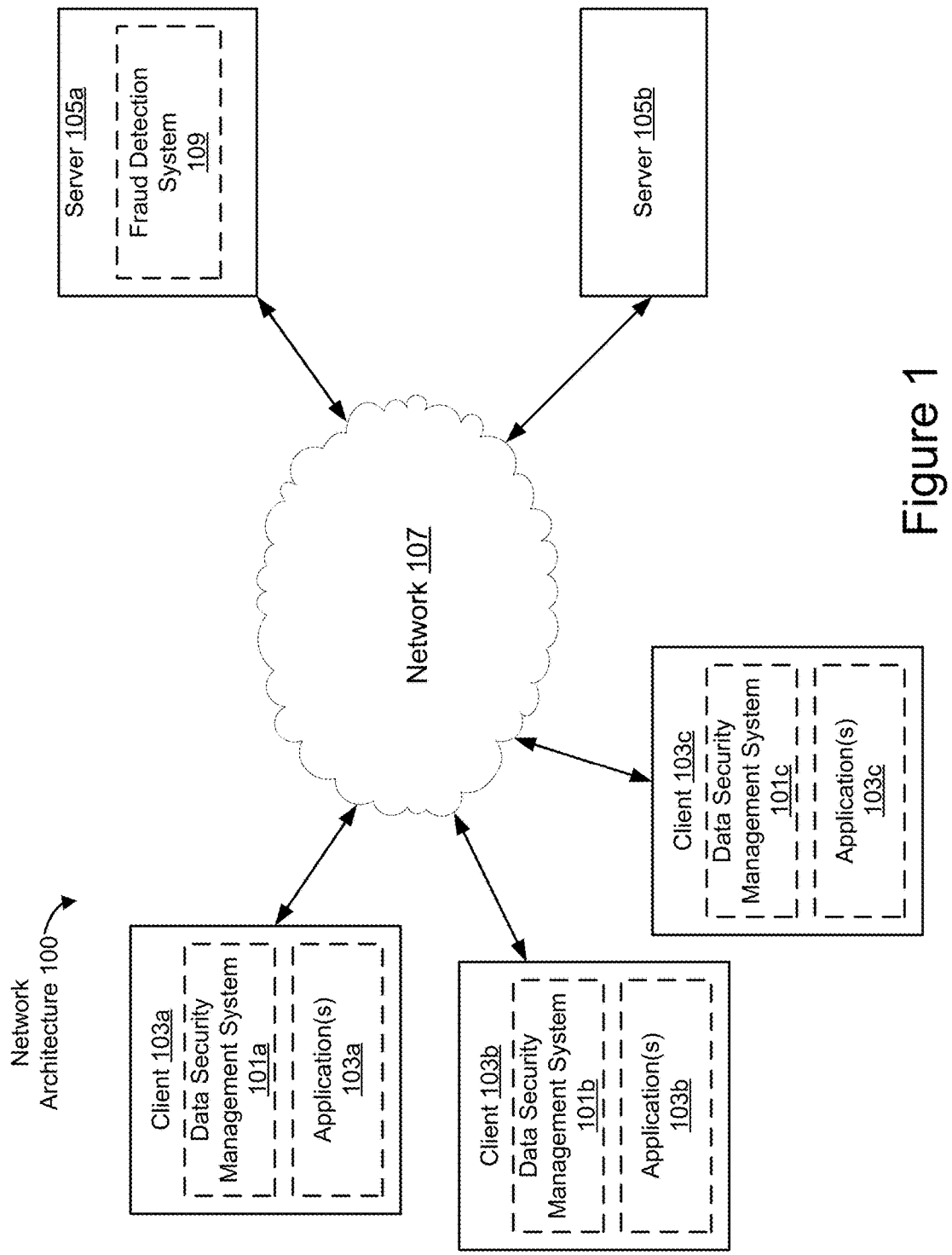
FIG. 1 is a block diagram of an exemplary network architecture in which a data security management system can be implemented, according to some embodiments.

FIG. 1 is a block diagram illustrating an exemplary network architecture 100 in which a data security management system 101 can be implemented. The illustrated network architecture 100 comprises multiple clients 103a, 103b and 103c, as well as multiple servers 105a and 105b. In FIG.

1, a fraud detection system 109 is illustrated as residing on a server 105a, and a separate data security management system 101a, 101b, and 101c is illustrated as residing on each of multiple clients 103a, 103b, and 103c, respectively. FIG. 1 also illustrates application(s) 102a, 102b, and 102c, as residing on clients 103a, 103b, and 103c, respectively. It is to be understood that this is an example only, and, in various embodiments, various functionalities of the data security management system 101, fraud detection system 109 and/or application(s) 102 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser, application(s) 102, or other client software (not shown), etc. Clients 103 can be in the form of computing devices, such as tablet computers, smart phones, wearable devices, servers, desktop or laptop computers, etc., all of which are types of computer systems 210 capable of connecting to a network 107 and running applications.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

The example network architecture 100 illustrated in FIG. 1 shows a computer network 107; a data security management system 101 and application(s) 102 operable on, for example, a client 103a, and a fraud detection system 109 operable on the server 105a. The client 103 may represent a computer system 210, for example, as described elsewhere herein. The servers 105a and 105b may represent first and/or third party servers for implementing the technology described herein, for example. The application(s) 102 may represent any applications operable on the client device 103, such as a browser or dedicated application. The data security management system 101 may represent an application or other code operable on the client 103.

The data security management system 101 may include computer logic operable to receive or retrieve and process data from the clients 103 (e.g., applications 102 or other components of the clients 103) and/or other entities of the network architecture 100. The data security management system 101 may use the data from the clients 103 and/or application(s) 102 operable thereon, for example, to defeat wireless signal interference hacks by manipulating signal strength. For instance, the data security management system 101 may be configured to defeat wireless signal interference hacks by manipulating signal strength and performing other operations described herein and, in some instances, providing data representing the same, such as honeypot data (e.g., honeypot text, honeypot passwords, contextual information, etc.), as described herein, to the fraud detection system 109 and/or receiving data, such as security alerts, information about untrusted networks, etc., from the fraud detection system 109.

The fraud detection system 109 may include computer logic operable to receive or retrieve and process data from the clients 103, the server 105b, and/or other entities of the network architecture 100. The fraud detection system 109 may use the data from the clients 103, for example, to identify unsecure or dangerous networks, locations, or attackers using signal interference based hacks, as described herein. For instance, the data access management system 109 may receive honeypot text and/or associated contextual information from a client device 103 and usage data regarding usage of the honeypot text from another client device 103, a separate server 105b, or services operable on the same server 105a as the fraud detection system 109.

It should be understood that while these and other embodiments are described throughout this specification, other embodiments and uses for the technology described herein are possible and contemplated.

Figure 2:
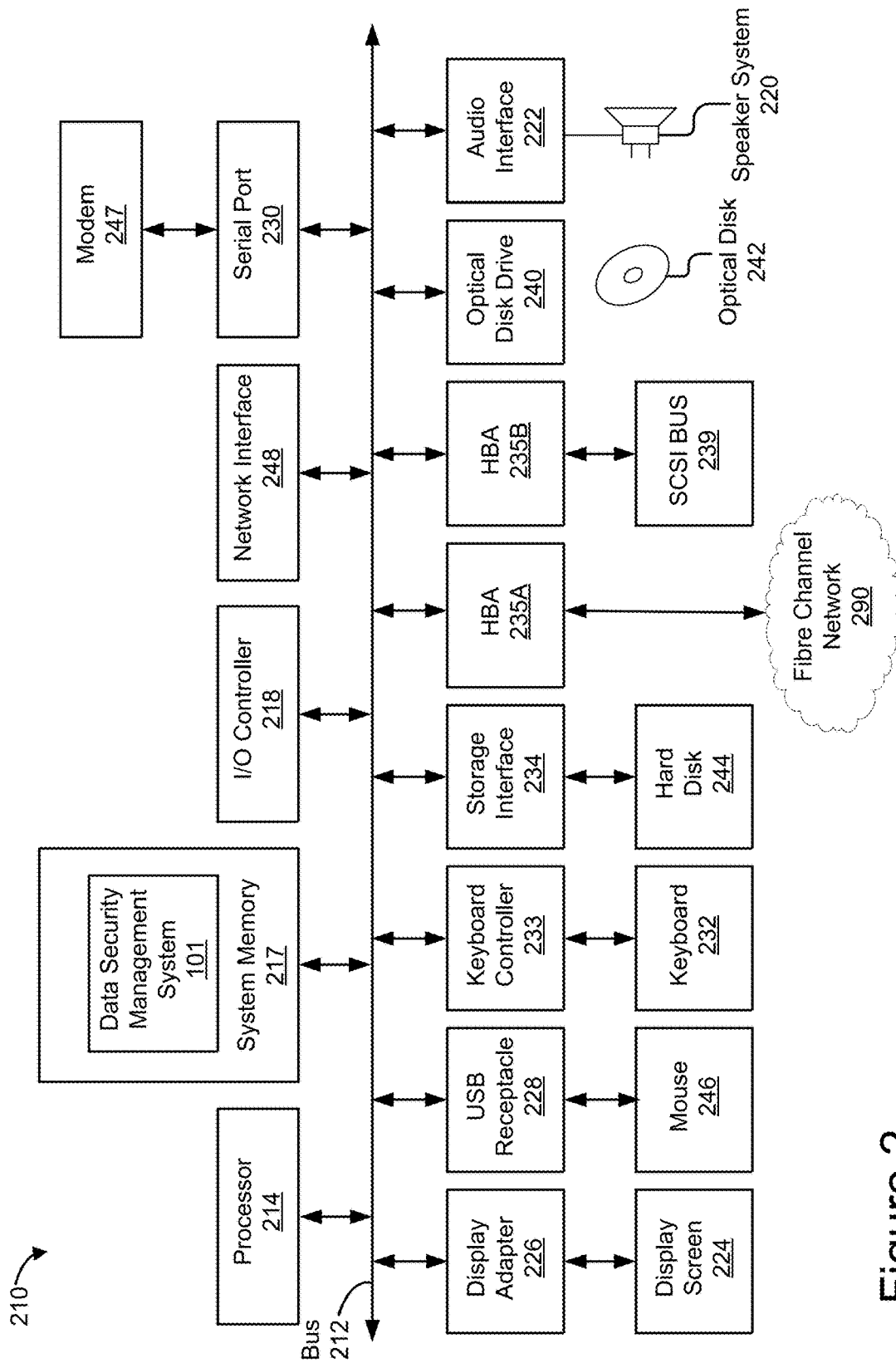
FIG. 2 is a block diagram of a computer system suitable for implementing a data security management system, according to some embodiments.

FIG. 2 is a block diagram of a computer system 210 suitable for implementing a data security management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 232 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above, may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs (e.g., in some instances, the data security management system 101, the data access management system 109, etc.) can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the data security management system 101 is illustrated as residing in system memory 217. The workings of the data security management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

Figure 3:
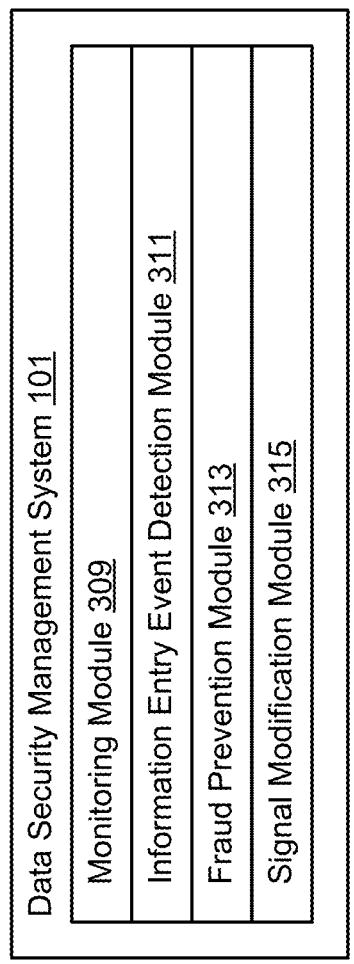
FIG. 3 is a block diagram of a data security management system, according to some embodiments.

FIG. 3 illustrates components of a data security management system 101, according to some embodiments. As described above, the functionalities of the data security management system 101 can reside on a server 105, a client 103, or be distributed between multiple computer systems 210, including within a cloud-based computing environment in which some of the functionality of the data security management system 101 is provided as a service over a network 107. It is to be understood that although the data security management system 101 is illustrated in FIG. 3 as a single entity, the illustrated data security management system 101 may represent a collection of functionalities, which can be instantiated as a single or multiple modules as desired (an instantiation of specific, multiple modules of the data security management system 101 is illustrated in FIG. 3). It is to be understood that the modules of the data security management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the data security management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In different embodiments, the data security management system 101 may be registered with the fraud detection system 109. Additionally, the data security management system 101 can be in the form of functionality provided by an application running on a computing device, which in turn can, but need not be, a more comprehensive security application. It is to be understood that although the data security management system 101 is illustrated in FIG. 3 as a single entity, the data security management system 101 represents a collection of functionalities, which can be instantiated as a single or multiple modules as desired.

In some embodiments, the monitoring module 309, information entry event detection module 311, fraud prevention module 313, and/or signal modification module 315 may be implemented as software, hardware, or a combination of these. In some embodiments, the monitoring module 309, information entry event detection module 311, fraud prevention module 313, and/or signal modification module 315 may be communicatively coupled by the bus 212 and/or the processor(s) 214 to one another and/or the other components of the computer system 210. In some embodiments, one or more of the components 309, 311, 313, and 315 are sets of instructions executable by the processor(s) 214. In further embodiments, one or more of the components 309, 311, 313, and 315 are storable in the memory(ies) 217 and are accessible and executable by the processor(s) 214. In any of the foregoing embodiments, these components 309, 311, 313, and 315 may be adapted for cooperation and communication with the processor(s) 214 and other components of the computer system 210.

Figure 4:
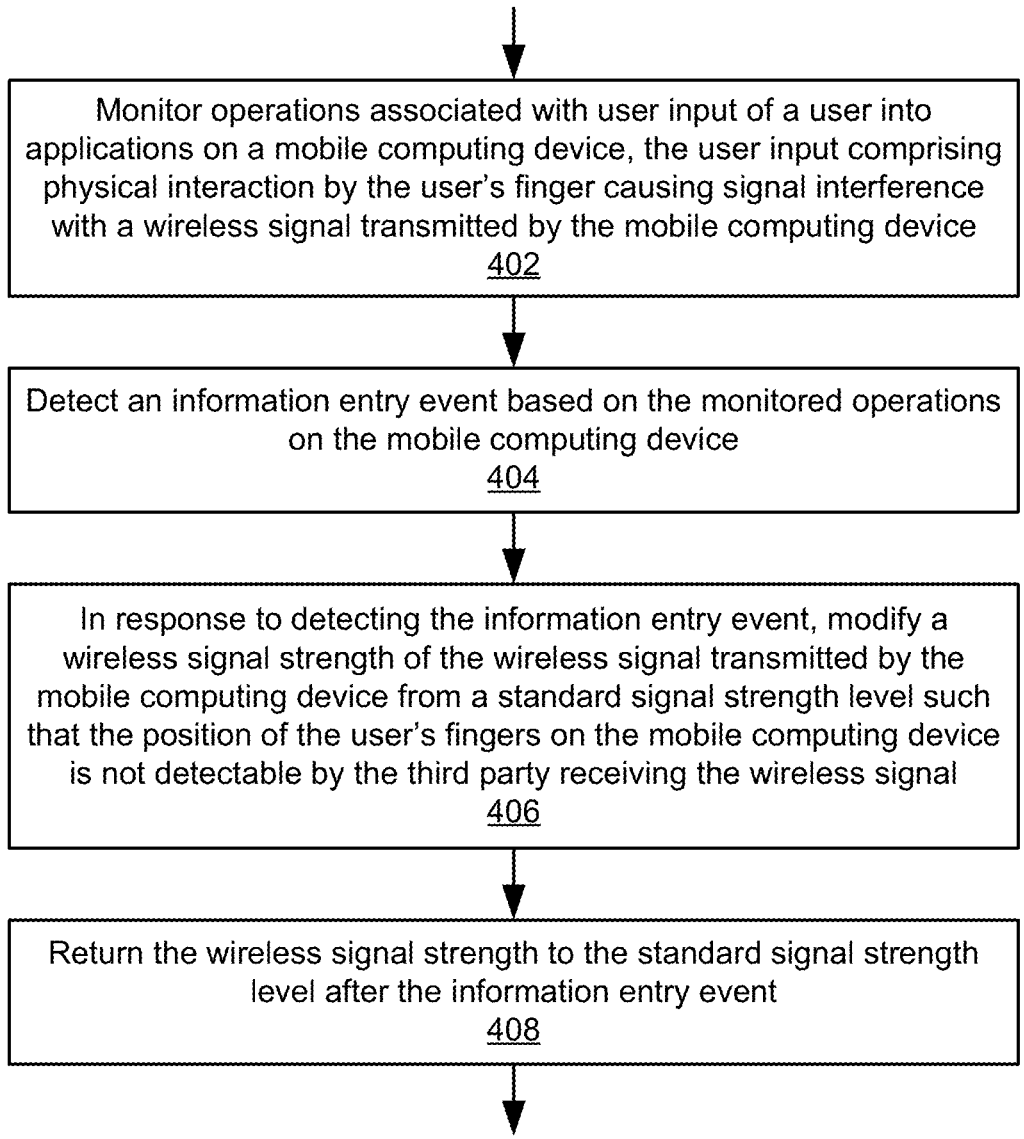
FIG. 4 is a flowchart of an example method for defeating wireless signal interference hacks by manipulating signal strength, according to some embodiments.

In some embodiments, the monitoring module 309, information entry event detection module 311, fraud prevention module 313, and/or signal modification module 315 may include computer logic operable to perform the operations described in further detail throughout this specification, for example, in reference to FIGS. 4 and 5. For example, the monitoring module 309 may be programmed to monitor operations associated with user input of a user into one or more applications 102 on the mobile computing/client device 103; the information entry event detection module 311 may be programmed to detect an information entry event based on the monitored operations on the client device 103; the fraud prevention module 313 may be programmed to provide honeypot text, provide patterns of modulation for honeypot text, and/or associate contextual information with the honeypot text; and the signal modification module 315 may be programmed to modify a wireless signal strength of the wireless signal transmitted by the client device 103.

FIG. 4 is a flowchart of an example method for defeating wireless signal interference hacks by manipulating signal strength, according to some embodiments. At 402, the monitoring module 309 may monitor operations associated with user input of a user into applications 102 on a mobile computing device (e.g., the client device 103). The user input may include a physical interaction by the user's finger causing signal interference with a wireless signal transmitted by the client device 103. The signal interference may be such that a position of the user's finger(s) is detectable by a third party (e.g., an attacker) receiving the wireless signal.

In some embodiments, the monitoring module 309 may monitor application(s) 102 operable on the client device 103. In some instances, the monitoring can be implemented by intercepting or otherwise hooking system calls that perform data access functionality, and wrapping them with code that executes the desired monitoring functionality. For example, calls that provide data input functionality and/or implement network communication can be intercepted, so as to detect and monitor data access and operations that may receive textual or potentially sensitive data via user interaction with the client device 103. Similarly, calls to access a file system (e.g., open, read, write, seek) can be intercepted, to detect and monitor client level interaction with local copies of data. Although these examples are provided, other embodiment mechanics for receiving and/or monitoring data can be used in other embodiments.

At 404, the information entry event detection module 311 may detect an information entry event based on the monitored operations on the client device 103. In some embodiments, an information entry event may include that the application 102 displays certain interfaces to the user or receives certain input from the user. For example, interfaces may include display of a text entry field, password entry field, credit card entry field, a virtual keyboard, etc. The certain input from the user may include that the application 102 receives selection of a particular interface, such as those listed above, that the user selects a text entry field, that the user enters information (e.g., via a virtual keyboard), etc.

In some embodiments, the information entry event may include entry of sensitive information (e.g., a password, passcode, user ID, credit card number, birthdate, social security number, e-mail address, etc.) into the client device 103 by the user. For example, in some instances, the information entry event may include entry of a password into a password field, selection of a password field by the user, or display of a password field by the application 102. In some instances, the information entry event may comprise entry of a credit card number into an application 102 on the client device 103 by the user. It should be noted that these are provided merely as examples and that other information entry events are possible and contemplated.

Depending on the embodiment, an information entry event may be of any definable duration. For example, the information entry event may begin only when the user begins (or is about to begin) physically interacting with the client device 103 or the information entry event may begin when the application 102 presents a particular interface or text entry field, for example. Similarly, the information entry event may terminate when the user stops providing input (e.g., entering text, selecting graphical elements, etc.) in the client device 103, when the text entry field is deselected or removed from display, or when the application 102 transmits (or attempts to transmit) the information over the wireless signal, for example.

At 406, in response to detecting the information entry event, the signal modification module 315 may modify a wireless signal strength of the wireless signal transmitted by the client device 103 (e.g., a mobile computing device) from a standard signal strength level (e.g., a substantially constant or uniform signal strength that may be transmitted in absence of manipulation according to the techniques described herein) such that the position of the user's fingers on the client device 103 is not detectable by the third party receiving the wireless signal. The wireless signal strength may be modified by adapting the power input or output of a wireless radio (e.g., network interface 248) of the client device 103, although other embodiments are possible.

In some embodiments, modifying a wireless signal strength of the wireless signal transmitted by the client device 103 is further based on one or more criteria (e.g., may be performed over a time when a criterion is satisfied). For example, the one or more criteria may include that a wireless radio (e.g., the Wi-Fi™ radio) of the client device 103 is turned on (e.g., powered on, in use, or active); that the client device 103 is communicatively connected to a specific wireless network (e.g., a network defined by the fraud detection system 109), or to a specific class of wireless networks (e.g., an unknown or untrusted wireless network); that a display screen 224 is active, turned on, or unlocked; that the user is interacting with the client device 103, such as entering text; that there is enough surrounding Wi-Fi™ activity that an interference attack would be feasible; that the client device 103 is in an unknown or untrusted geographic location (e.g., as defined by suspicious activity by the fraud detection system 109 and determined by the client device 103, for instance, by GPS, Wi-Fi™ networks, or mobile networks); etc. It should be understood that other criteria are possible and contemplated.

In some embodiments, modifying the wireless signal strength of the wireless signal further comprises modulating the wireless signal strength of the wireless signal during the information entry event according to a random pattern of modulation. In some instances, the random pattern of modulation may have a defined minimum signal level, which may be defined to avoid a loss of a network connection using the wireless signal, because, for example, a signal level that is below a threshold may cause Wi-Fi™ to disconnect from a wireless network. Similarly, the small variation in signal strength results in a decreased impact on battery performance of mobile computing devices.

In some embodiments, the signal modification module 315 may modify the wireless signal strength of the wireless signal by ceasing transmission of the wireless signal by the client device 103 during the information entry event. For example, the signal modification module 315 may stop all radio transmission of one or more radios transmitting a wireless signal (e.g., a Wi-Fi™ radio) while a user is providing input to the client device 103 that would be worth stealing, for example, when the user is entering a password, credit card number, or other sensitive information, or when a user is using an application 102 that contains sensitive data.

In some embodiments, the signal modification module 315 may vary the strength of the wireless signal in order to simulate the signal interference effect of specific data (e.g., keystrokes, touchscreen interaction, etc.) being physically entered by the user. For example, the signal modification module 315 may vary the signal strength before a user has entered information (e.g., a password), while a user is entering information, or after a user has entered information (e.g., if a signal transmission was ceased while the user was entering information). For example, in some embodiments, the signal modification module 315 may detect the location of the user's hand/finger/stylus via the keys (or other input interface) the user is pressing and adjust the signal strength to both disguise the keypress and simulate a different keypress. The signal modification module 315 may use touch screen detection, such as projected capacitive, surface acoustic wave, or optical touch, to detect which key (or graphical element on a touchscreen) a user's hand is about to press and adjust the signal strength to disguise the keypress and simulate a different keypress (e.g., concurrently with the signal interference by the user pressing the key). For example, the data security management system 101 may detect that the user is about to touch the virtual keys on a virtual keyboard corresponding to "1, 2, 3, 4," and manipulate the signal strength transmitted by the client device 103 to disguise the physical input and/or make it appear as though the user is touching another physical location on a touch screen to enter other information, such as "9, 9, 9, 9." For example, the other information may include honeypot information or text. Honeypot information may include information configured to detect fraudulent activity, as described in further detail elsewhere herein.

In some embodiments, the signal modification module 315 may generate a signal strength modification factor or pattern that may be combined with actual interference caused by the user's physical interaction with the client device 103 to create a goal signal strength output. For example, a goal signal strength may be a pattern of signal strength that appears to an eavesdropper as though the user has physically entered "9, 9, 9, 9," on the client device 103, and so the data security management system 101 may generate a signal strength modification factor based on the difference between the actual interference caused by the user (or projected to be caused by the user, as described above) and the goal signal strength. Accordingly, in this example, when the signal strength is modulated using the signal strength modification factor and affected by interference caused by the user input, the resulting transmitted signal strength would be the goal signal strength.

In some embodiments, the signal modification module 315 may modify the wireless signal strength of the wireless signal during the information entry event according to a specific pattern of modulation. In some instances, the specific pattern of modulation may be determined for the user based on a training of signal interference with the wireless signal by the one or more fingers of the user during entry of text or other input into the client device 103.

In some embodiments, the data security management system 101 may create an interference profile by performing training for a particular user (and/or client device 103) to determine signal interference caused by the user when physically interacting with the client device 103. For instance, a first user may produce different interference when typing the letter "Q" than a second user. Accordingly, some embodiments of the techniques described herein may modulate the signal strength using an interference profile for a specific user and/or client device 103 (e.g., as in the signal strength modification factor and/or the specific pattern of modulation). In some embodiments, the training may be performed by detecting the signal interference caused by the user physically interacting with the client device 103 using another computing device, such as a router, another client device 103, etc. The detected interference pattern may then be combined with the known user input (e.g., as monitored by the monitoring module 309) to generate an interference profile, which may be transmitted to the data security management system 101 on the client device 103 from the second computing device or the server 105 (e.g., as received from the second computing device or the client device 103).

In some instances, the specific pattern of modulation further comprises a pre-recorded signal strength pattern. The pre-recorded signal strength pattern may be configured to simulate entry of honeypot text by the user into the client device 103. For example, the simulated entry of honeypot text may be configured to mimic signal interference of one or more fingers of the user with the wireless signal during entry of the honeypot information/text. The signal modification module 315 may transmit the honeypot information during the information entry event, as described above, or the wireless signal may be ceased during the information entry event, after which the honeypot information may be transmitted (e.g., in the form of modulated signal strength).

Honeypot information is any information (e.g., password, credit card number, etc.) intentionally given to an attacker, in order to catch the attacker. For instance, if a party uses a honeypot password, it can be inferred that that party is an attacker. Detection of the honeypot information can be associated with the attacker, the location, network, etc., by which the attacker acquired the honeypot information. Accordingly, the attacker can be caught or users can be warned of a potential security risk. For example, the fraud detection system 109 may indicate a geographic location or network SSID to the data security management system 101 to designate that the network or location is untrusted or potentially unsecure, as described elsewhere herein. Accordingly, a user can be warned before connecting at an unsecure location or to an unsecure network, and/or the techniques described herein for modulating signal strength can be implemented.

In some embodiments, the fraud prevention module 313 may record contextual information associated with the transmission of the honeypot information (e.g., via signal strength modulation) and send the contextual information and honeypot information in a message to the fraud detection system 109, so that when an attacker uses the honeypot information, the fraud detection system 109 is aware of the context in which the attacker acquired the honeypot information. Contextual information may include, for example, wireless connection information, geographic location, network/hotspot SSID or MAC address, etc., of the client device 103 during the information entry event.

In some embodiments, the honeypot information/text may comprise a honeypot password. The usage of a honeypot password may be detected by detecting entry of the honeypot password into a server 105a or 105b and receiving (e.g., by the fraud detection system 109) notification from the server that the honeypot password has been used.

In some embodiments, the fraud detection system 109 may detect usage of the honeypot information/text and flag some or all of the contextual information to indicate that the context is a potential security risk. For example, if an attacker uses the honeypot information with the server 105a, or with a server 105b associated with the server 105a, the fraud detection system 109 may detect the usage and flag the contextual information as a potential security risk. For example, if an attacker uses a honeypot password to attempt to log in to a service provided by the server 105a, or a third-party server 105b, the honeypot password may be transmitted to the fraud detection system 109. A third-party server 105b may be connected to the server 105a, have an agreement to share information with the server 105a, or may be accessed via authentication through the server 105a. For example, the server 105a (or a server associated therewith) may provide a single sign on or other authentication service to access third-party services provided by third-party servers 105b.

In some embodiments, the honeypot information may comprise a honeypot credit card number. Usage of the honeypot credit card number may be detected, for example, by a banking entity (e.g., operable using a server 105b) associated with the honeypot credit card number. The honeypot credit card number may specifically formulated to pass a Luhn algorithm (e.g., so the honeypot credit card number appears real) and be routed to the particular banking entity for detection.

At 408, the signal modification module 315 may return the wireless signal strength to the standard signal strength level after the information entry event. In some embodiments, the information entered by the user may be transmitted by the client device 103 during or after the information entry event.

FIG. 5 is an illustration of an example mobile computing device 502 and example wave diagrams 514, 516, and 518 showing interference caused by a hand 512, according to some embodiments. As illustrated in FIG. 5, the mobile computing device 502 includes a touch screen 501 displaying a virtual keyboard 504. The Figure illustrates entry of information into a password entry field 506 (e.g., which may trigger the information entry event, according to some embodiments described herein). The mobile computing device 502 may be broadcasting a wireless signal, for example, during a connection 508 to a wireless receiver 510 (e.g., a hotspot, router, etc.).

The example signal diagrams 514, 516, and 518 illustrate interference caused by the user's hand 512 providing physical input into the virtual keyboard 504. For example, signal diagram 514 may be a wireless signal having a standard signal strength or an unmodified signal strength. The signal diagram 516 may represent interference caused by the hand 512. The signal diagram 518 may represent the resulting wireless signal once affected by the interference 516. It should be understood that these signal diagrams 514, 516, and 518 are provided for clarity of description and that they do not necessarily represent actual signals or interferences.

An attacker may hack or plant the wireless receiver 510 to receive the signal 518. The attacker may then attempt to extract the motion or position of the hand 512 from the signal interference pattern. The operation of the data security management system 101 described herein can defeat these wireless signal interference hacks.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
    monitoring operations associated with user input of a user into one or more applications on a mobile computing device, wherein the user input comprises physical interaction by one or more fingers of the user with the mobile computing device causing signal interference by the one or more fingers of the user with a wireless signal transmitted by the mobile computing device, a position of the one or more fingers of the user being detectable by a third party receiving the wireless signal;
    detecting an information entry event based on the monitored operations on the mobile computing device;
    in response to detecting the information entry event, modifying a wireless signal strength of the wireless signal transmitted by the mobile computing device from a standard signal strength level in order to avoid the position of the one or more fingers of the user on the mobile computing device being detectable by the third party receiving the wireless signal, wherein modifying the wireless signal strength of the wireless signal comprises modulating the wireless signal strength of the wireless signal during the information entry event according to at least one of a random pattern of modulation and a specific pattern of modulation; and
    returning the wireless signal strength to the standard signal strength level after the information entry event.

2. The computer-implemented method of claim 1, wherein modifying the wireless signal strength of the wireless signal further comprises ceasing transmission of the wireless signal by the mobile computing device during the information entry event.

3. The computer-implemented method of claim 1, wherein the random pattern of modulation has a defined minimum signal level, the defined minimum signal level being defined to avoid a loss of a network connection, the network connection using the wireless signal.

4. The computer-implemented method of claim 1, wherein the specific pattern of modulation is determined for a user based on a training of signal interference with the wireless signal by the one or more fingers of the user during entry of text on the mobile computing device.

5. The computer-implemented method of claim 1, wherein the specific pattern of modulation further comprises a pre-recorded signal strength pattern, the pre-recorded signal strength pattern configured to simulate entry of honeypot text by the user into the mobile computing device, the simulated entry of the honeypot text being configured to mimic signal interference of the one or more fingers of the user with the wireless signal during entry of the honeypot text.

6. The computer-implemented method of claim 5, further comprising recording contextual information of the information entry event and associating the contextual information with the honeypot text.

7. The computer-implemented method of claim 6, wherein the contextual information further comprises a geographic location of the mobile computing device during the information entry event.

8. The computer-implemented method of claim 6, wherein the contextual information further comprises wireless network connection information of the mobile computing device during the information entry event.

9. The computer-implemented method of claim 6, further comprising detecting usage of the honeypot text and flagging the contextual information as a potential security risk.

10. The computer-implemented method of claim 9, wherein the honeypot text further comprises a honeypot credit card number and detecting usage of the honeypot text further comprises detecting usage of the honeypot credit card number by a banking entity associated with the honeypot credit card number.

11. The computer-implemented method of claim 9, wherein
    the honeypot text further comprises a honeypot password; and
    detecting usage of the honeypot text further comprises detecting entry of the honeypot password into a server, and receiving notification from the server that the honeypot text has been used.

12. The computer-implemented method of claim 1, wherein modifying a wireless signal strength of the wireless signal transmitted by the mobile computing device is further based on one or more criteria, the one or more criteria including that a wireless radio of the mobile computing device is turned on.

13. The computer-implemented method of claim 12, wherein the one or more criteria further comprises that the mobile computing device is communicatively connected to an untrusted wireless network via the wireless signal.

14. The computer-implemented method of claim 1, wherein the information entry event further comprises entry of sensitive information into the mobile computing device by the user.

15. The computer-implemented method of claim 14, wherein the information entry event further comprises entry of a password into the one or more applications on the mobile computing device by the user.

16. The computer-implemented method of claim 14, wherein the information entry event further comprises entry of a credit card number into the one or more applications on the mobile computing device by the user.

17. A non-transitory computer readable medium storing instructions that, when executed by a mobile computing device having one or more processors, causes the one or more processors to perform operations comprising:
    monitoring operations associated with user input of a user into one or more applications on the mobile computing device, wherein the user input comprises physical interaction by one or more fingers of the user with the mobile computing device causing signal interference by the one or more fingers of the user with a wireless signal transmitted by the mobile computing device, a position of the one or more fingers of the user being detectable by a third party receiving the wireless signal;

detecting an information entry event based on the monitored operations on the mobile computing device;

in response to detecting the information entry event, modifying a wireless signal strength of the wireless signal transmitted by the mobile computing device from a standard signal strength level in order to avoid the position of the one or more fingers of the user on the mobile computing device being detectable by the third party receiving the wireless signal, wherein modifying the wireless signal strength of the wireless signal comprises modulating the wireless signal strength of the wireless signal during the information entry event according to at least one of a random pattern of modulation and a specific pattern of modulation; and returning the wireless signal strength to the standard signal strength level after the information entry event.

18. A mobile computing device comprising:

a non-transitory computer readable memory;

at least one processor;

a monitoring module programmed to monitor operations associated with user input of a user into one or more applications on the mobile computing device, wherein the user input comprises physical interaction by one or more fingers of the user with the mobile computing device causing signal interference by the one or more fingers of the user with a wireless signal transmitted by the mobile computing device, a position of the one or more fingers of the user being detectable by a third party receiving the wireless signal, the at least one processor configured to execute the monitoring module;

an information entry event detection module programmed to detect an information entry event based on the monitored operations on the mobile computing device, the at least one processor configured to execute the information entry event detection module, the information entry event detection module communicatively coupled to the monitoring module to receive data describing the monitored operations; and a signal modification module programmed to modify a wireless signal strength of the wireless signal transmitted by the mobile computing device from a standard signal strength level in order to avoid the position of the one or more fingers of the user on the mobile computing device being detectable by the third party receiving the wireless signal in response to receiving a notification of the information entry event from the information entry event detection module and return the wireless signal strength to the standard signal strength level after the information entry event, wherein modifying the wireless signal strength of the wireless signal comprises modulating the wireless signal strength of the wireless signal during the information entry event according to at least one of a random pattern of modulation and a specific pattern of modulation, the at least one processor configured to execute the signal modification module, the signal modification module communicatively coupled to the information entry event detection module.

* * * * *